3,005,825
NITROALCOHOLS
Dale N. Robertson, Midland, Mich., assignor to The Dow Chemical Company, Midland, Mich., a corporation of Delaware
No Drawing. Filed Dec. 31, 1958, Ser. No. 784,082
10 Claims. (Cl. 260—289)

This invention is concerned with nitroalcohols and particularly with α-(α-nitrobenzyl)pyridinemethanols and α-(α-nitrobenzyl)quinolinemethanols corresponding to formula

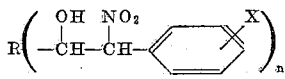

In this and succeeding formulae, R represents a radical having a pyridine or a quinoline nucleus, X is hydrogen, fluorine, chlorine or bromine and n is 1 or 2. By the expression "a radical having a pyridine or quinoline nucleus" is meant a radical having one of the following structures

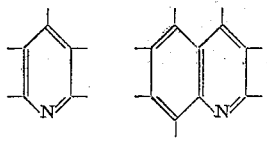

wherein one or two of the free valences of the ring containing the nitrogen atom is attached to the nitroalcohol group,

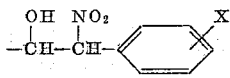

and the remaining valences are satisfied by hydrogen, methyl or ethyl of which at most two are alkyl substituents. Examples of such radicals include 2-, 3-, and 4-pyridyl, 2-, 3- and 4-quinolyl, 8-ethyl-2-quinolyl, 3,8-dimethyl-2-quinolyl, 6-methyl-2-pyridyl, 4,6-dimethyl-2-pyridyl, 6-methyl-2-quinolyl, 8-methyl-2-quinolyl, 4-methyl-2-quinolyl, 2-methyl-3-pyridyl, 3-methyl-2-quinolyl, 2,6-pyridylene and 2,4-quinolylene.

These α-(α-nitrobenzyl)pyridine- or α-(α-nitrobenzyl)-quinolinemethanols are white crystalline solids, soluble in dilute mineral acids and dilute alkali and in common polar organic solvents such as acetone, alcohol, ethyl acetate and substantially insoluble in petroleum ether, water and aqueous sodium bicarbonate solution.

The products of this invention are useful as parasiticides and are particularly useful for the control of insects, nematodes, helminths, mites, bacteria, and fungi. In addition, these compounds are useful as chelating agents and also as intermediates for the preparation of other biologically active compounds.

The compounds of the invention may be prepared by the reaction of a pyridine- or quinoline-carboxaldehyde having the structure, R(—CHO)$_n$, with a phenylnitromethane having the structure

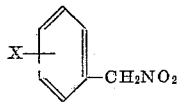

in the presence of an amine catalyst. In carrying out the reaction, substantially equimolar proportions of the appropriate carboxaldehyde and a phenylnitromethane are mixed together in a reaction solvent, and a catalytic amount of amine is mixed thereinto. An exothermic reaction takes place with the formation of the desired nitroalcohol product which on standing precipitates in the reaction mixture as a white crystalline solid. The latter may be recovered and purified by conventional methods.

The relative amounts of the reactants employed depend on the pyridine- or quinolinecarboxaldehyde employed and on whether a mono- or di-nitroalcohol is to be prepared. Thus, if a mononitroalcohol is to be prepared from a monocarboxaldehyde, approximately equimolar proportions of the reactants are employed. If a dinitroalcohol is to be prepared from a dicarboxaldehyde, approximately two molar proportions of a phenylnitromethane are employed for each molar proportion of the dicarboxaldehyde. Suitable solvents for carrying out this reaction include ethanol, methanol, isopropanol, ethyl acetate, benzene and dioxane. Preferred catalysts for this reaction are secondary and tertiary amines and include diethylamine, dimethylamine, diisopropylamine, trimethylamine and triethylamine. The reaction may be carried out in the temperature range of from about 0° to 75° C. The preferred temperature range is from 15° to 40° C. The reaction is mildly exothermic and is conveniently carried out by mixing at room temperature and permitting the reaction to take place at the ambient temperature. The reaction takes place over a period of from a few minutes to about 24 hours. When the reaction is carried out at ambient temperature, most of the reaction will have taken place within one hour but the reaction mixture may be allowed to stand overnight to insure substantial completion of reaction.

In the preferred method for carrying out this reaction, a pyridine- or quinolinecarboxaldehyde and a phenylnitromethane are mixed together in a solvent until a homogeneous solution is obtained. Amine catalyst is then added to the solution and the resulting mixture agitated for a few minutes and then allowed to stand for from 1 to 24 hours to obtain the desired α-(α-nitrobenzyl)pyridine- or α-(α-nitrobenzyl)quinolinemethanol product which precipitates in the reaction mixture as a white crystalline solid. The latter may then be recovered by filtration and purified by recrystallization from a suitable solvent.

The following examples illustrate the invention but are not to be construed as limiting.

*Example 1.—α-(α-Nitrobenzyl)-2-pyridinemethanol*

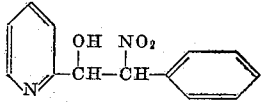

21.4 grams (0.2 mole) of pyridine-2-carboxaldehyde and 27.4 grams (0.2 mole) of phenylnitromethane were mixed together in 50 milliliters of absolute ethanol to obtain a clear homogeneous solution. 10 drops of diethylamine was added thereto and the resulting mixture agitated for about 2 minutes. During the agitation, a reaction took place with evolution of heat. The reaction mixture was then allowed to stand in the dark for about 1 hour whereupon an α-(α-nitrobenzyl)-2-pyridine-methanol product was found to have precipitated forming a substantially solid mass of white crystals. The mixture was allowed to stand overnight to insure completion of the reaction and the product then recovered by filtration. The recovered product was washed with a few milliliters of ethanol and dried in the presence of phosphorus pentoxide under reduced pressure. The yield of the product was 42.3 grams or 86.7 percent of theoretical. α-(α-Nitrobenzyl)-2-pyridinemethanol recrystallized from ethyl acetate melts at 106°–107° C.

*Example 2.—α-(α-Nitrobenzyl)-4-pyridinemethanol*

21.4 grams (0.2 mole) of pyridine-4-carboxaldehyde and 27.4 grams (0.2 mole) of phenylnitromethane were dissolved in 50 milliliters of absolute ethanol. To the resulting mixture was added 10 drops of diethylamine catalyst whereupon a reaction took place with evolution of heat. After a period of less than 30 minutes, an α-(α-nitrobenzyl)-4-pyridinemethanol product began to precipitate in the reaction mixture as a white crystalline solid. The mixture was allowed to stand at room temperature for several days and then filtered to recover the product. The latter was washed several times with alcohol and then dried over phosphorus pentoxide under reduced pressure. The yield of the product was 42.9 grams or 87.9 percent of theoretical. α-(α-Nitrobenzyl)-4-pyridinemethanol recrystallized from ethanol-dioxane mixture melts at 125°–125.5 C. with decomposition. The molecular weight of this product determined by perchloric acid titration in acetic acid is found to be 245.5. The theoretical value is 244.25.

*Example 3.—α-(α-Nitrobenzyl)-3-pyridinemethanol*

21.4 grams (0.2 mole) of pyridine-3-carboxaldehyde and 27.4 grams (0.2 mole) of phenylnitromethane were dissolved in 25 milliliters of ethyl acetate. To the resulting mixture was added 6 drops of diethylamine catalyst whereupon a reaction took place with the formation of α-(α-nitrobenzyl)-3-pyridinemethanol product. The latter began to precipitate in the reaction mixture as white crystals about 30 minutes after addition of the catalyst. The mixture was then allowed to stand for about 3 days. The crystals were washed with ethanol and dried under reduced pressure over phosphorus pentoxide. The yield of the product amount to 42.3 grams or 86.7 percent of theoretical. α - (α-Nitrobenzyl) - 3 - pyridinemethanol recrystallized from ethanol melts at 123.7–124.3° C. This product had a carbon content of 63.52 percent and a hydrogen content of 4.74 percent. The theoretical values are 63.92 percent and 4.95 percent, respectively.

*Example 4.—α-(α-Nitrobenzyl)-2-quinolinemethanol*

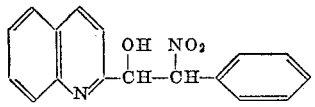

7.86 grams (0.05 mole) of quinoline-2-carboxaldehyde and 7 grams (0.05 mole) of phenylnitromethane were mixed together in 10 milliliters of absolute ethanol and 3 drops of diethylamine added thereto. A reaction took place immediately and precipitation of a reaction product started even before all of the reactant aldehyde had dissolved in the reaction mixture. The mixture was warmed for a few minutes on a steam bath and then allowed to cool and stand overnight at room temperature to obtain an α-(α-nitrobenzyl)-2-quinolinemethanol product. The latter was recovered by filtration and recrystallized from ethyl acetate-ethanol to obtain white, fluffy, needle-like crystals having a carbon content of 69.67 percent and a hydrogen content of 4.72 percent. The theoretical values are 69.38 percent and 4.79 percent, respectively. α-(α-Nitrobenzyl)-2-quinolinemethanol melts at 141° C. with decomposition when the determination is carried out on a prewarmed melting point block.

*Example 5.—α-(α-Nitrobenzyl)-4-quinolinemethanol*

7.9 grams (0.05 mole) of quinoline-4-carboxaldehyde and 7 grams (0.05 mole) of phenylnitromethane are mixed together in 15 milliliters of absolute ethanol and the mixture agitated until the reactants are in solution. Four drops of dimethylamine are added to the mixture and the agitation continued for several minutes. The resulting mixture is then allowed to stand for 20 hours at room temperature to obtain a crystalline α-(α-nitrobenzyl)-4-quinoline-methanol product having a molecular weight of 294.

*Example 6.—α-(α-Nitrobenzyl)-3-quinolinemethanol*

15.8 grams (0.1 mole) of quinoline-3-carboxaldehyde and 13.6 grams (0.1 mole) of phenylnitromethane are mixed together in 30 milliliters of ethyl acetate and the mixture stirred until the reactants are in solution. Eight drops of triethylamine are added to the mixture and the agitation contained for several minutes. The resulting mixture is then allowed to stand at room temperature for 24 hours to obtain a crystalline α-(α-nitrobenzyl)-3-quinolinemethanol product having a molecular weight of 294.

*Example 7.—6-methyl-α-(α-nitrobenzyl)-2-pyridinemethanol*

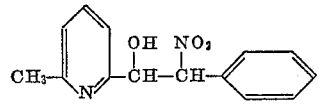

6.1 grams (0.05 mole) of 6-methylpyridine-2-carboxaldehyde and 6.9 grams (0.05 mole) of phenylnitromethane were mixed together in 10 milliliters of ethanol. A few drops of triethylamine were added thereto and the resulting mixture agitated for a few minutes and then allowed to stand for several days at room temperature. A drop of the reaction mixture was added to a small amount of water and scratched to produce seed crystals. The crystals formed were added to the reaction mixture to precipitate a 6-methyl-α-(α-nitrobenzyl)-2-pyridinemethanol product as a white crystalline solid in a yield of 11.7 grams or 90 percent of theoretical. The product after recrystallization from ethanol-water mixture melted at 99.5°–104° C.

*Example 8.—8-methyl-α-(α-nitrobenzyl)-2-quinolinemethanol*

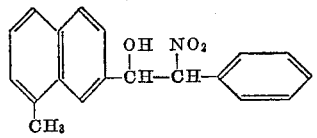

In a manner similar to that described in Example 7, 8-methyl-α-(α-nitrobenzyl)-2-quinolinemethanol having a molecular weight of 308 is prepared by the reaction of 8-methylquinoline-2-carboxaldehyde and phenylnitromethane in the presence of triethylamine.

*Example 9*

In a manner similar to that described in Example 7, the following α-(α-nitrobenzyl)quinolinemethanols are prepared:

8-ethyl-α-(α-nitrobenzyl)-2-quinolinemethanol having a molecular weight of 322 by the reaction of 8-ethyl-quinoline-2-carboxaldehyde and phenylnitromethane in the presence of triethylamine.

3.8-dimethyl-α-(p-chloro-α-nitrobenzyl) - 2 - quinolinemethanol having a molecular weight of 356.5 by the reaction of 3,8-dimethylquinoline-2-carboxaldehyde and p-chlorophenylnitromethane in the presence of triethylamine.

4-methyl-α-(m-chloro-α-nitrobenzyl) - 2 - quinolinemethanol having a molecular weight of 342.5 by the reaction of 4 - methylquinoline-2-carboxaldehyde and m-chlorophenylnitromethane in the presence of triethylamine.

*Example 10.—4,6-dimethyl-α-(α-nitrobenzyl)-2-pyridinemethanol*

13.5 grams (0.1 mole) of 4,6-dimethylpyridine-2-carboxaldehyde and 13.7 grams (0.1 mole) of phenylnitromethane were mixed together in 15 milliliters of absolute ethanol and about 8 drops of triethylamine added thereto and the mixture agitated. A reaction occurred with evolution of heat. The mixture was allowed to stand at ambient temperature for about 10 minutes, thereafter a drop of reaction mixture was removed and mixed with water to obtain crystals of the product. The crystals obtained were employed to seed the reaction mixture to precipitate a 4,6-dimethyl-α-(α-nitrobenzyl) - 2 - pyridinemethanol product in a yield of 26.0 grams or 95.6 percent of theoretical. The product after recrystallization from ethanol-water melted at 124°–127.5° C. The product had a carbon content of 66.14 percent and a hydrogen content of 5.54 percent. The theoretical values are 66.16 percent and 5.92 percent, respectively.

*Example 11.—α-(p-fluoro-α-nitrobenzyl)-2-pyridinemethanol*

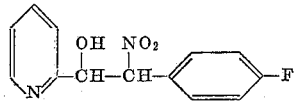

3.0 grams (0.0193 mole) of p-fluorophenylnitromethane and 2.0 grams (0.0187 mole) of pyridine-2-carboxaldehyde were mixed together in 5 milliliters of ethanol. Two drops of triethylamine were added thereto and the mixture agitated whereupon an exothermic reaction took place. Seed crystals were prepared by adding a drop of the reaction mixture into water. The reaction mixture was seeded with seed crystal thus prepared to precipitate an α-(p-fluoro-α-nitrobenzyl)-2-pyridinemethanol product melting at 116.5°–119.5° C. The product had a neutral equivalent of 264. The theoretical value is 262.2.

*Example 12*

In a manner similar to that described in Example 11, the following compounds are prepared:

α-(p-Chloro-α-nitrobenzyl)-2-pyridinemethanol having a molecular weight of 278.7 by the reaction of pyridine-2-carboxaldehyde and p-chlorophenylnitromethane.

α-(p-Bromo-α-nitrobenzyl)-2-pyridinemethanol having a molecular weight of 323.2 by the reaction of pyridine-2-carboxaldehyde and p-bromophenylnitromethane.

α-(o-Fluoro-α-nitrobenzyl)-4-pyridinemethanol having a molecular weight of 262.2 by the reaction of pyridine-4-carboxaldehyde and o-fluorophenylnitromethane.

α-(p-Fluoro-α-nitrobenzyl)-2-quinolinemethanol having a molecular weight of 312.3 by the reaction of quinoline-2-carboxaldehyde and p-fluorophenylnitromethane.

*Example 13.—α,α'-Bis(α-nitrobenzyl)-2,6-pyridinemethanol*

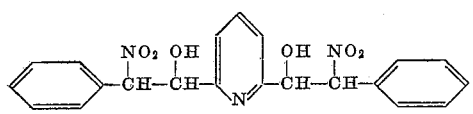

6.8 grams (0.05 mole) of pyridine-2,6-dicarboxaldehyde and 13.7 grams (0.1 mole) of phenylnitromethane were mixed in 50 milliliters of ethanol and warmed on a steam bath for a few minutes. Six drops of triethylamine was added thereto. The resulting mixture was agitated, allowed to stand first at room temperature for about 20 hours and thereafter at about 5° C. for about 20 hours to complete the crystallization of the α,α'-bis(α-nitrobenzyl)-2,6-pyridinemethanol product as white crystalline needles. The latter was obtained in a yield of 16.5 grams or 80.5 percent of theoretical, and after recrystallization from ethyl acetate had a melting point of 144.5°–147° C.

*Example 14*

In a manner similar to that described in Example 13, 3.4 grams (0.025 mole) of pyridine-2,6-dicarboxaldehyde and 7.8 grams (0.05 mole) of p-fluorophenylnitromethane are mixed together and heated on a steam bath in 15 milliliters of 95 percent ethyl alcohol in the presence of 6 drops of triethylamine to produce α,α'-bis(p-fluoro-α-nitrobenzyl)-2,6-pyridinemethanol having a molecular weight of 445.4.

*Example 15*

In a manner similar to that described in Example 13, α,α'-bis(α-nitrobenzyl)-2,4-quinolinemethanol having a molecular weight of 459.4 is prepared by the reaction of one molar proportion of quinoline-2,4-dicarboxaldehyde with two molar proportions of phenylnitromethane in the presence of triethylamine.

The products of this invention are useful as parasiticidal, insecticidal and antimicrobial agents. These compounds are particularly useful as antimicrobial agents for the preservation of synthetic latex and latex paint compositions against attack by microorganisms. Antimicrobial agents suitable for the preservation of synthetic latex are difficult to find. Many known preservatives are totally unsuitable for latex or latex paint preservation since they frequently affect the stability of the colloidal dispersion, the brushing or spreading characteristics, or the films formed therefrom. Furthermore, certain preservatives are frequently effective only when employed in such high concentration as to modify the properties of the latex or when the latex composition has a pH higher than 9. For many uses, a highly alkaline pH is undesirable and a preservative is desirable which is effective at low pH. The effectiveness of the compounds of the present invention as preservatives is not dependent on highly alkaline pH of the latex medium. Furthermore, the compounds of the present invention are effective at very low concentrations.

In a representative operation, α-(α-nitrobenzyl)-2-pyridinemethanol was added to commercial styrene-butadiene copolymer latex to produce a modified latex composition containing α-(α-nitrobenzyl)-2-pyridinemethanol in varying concentrations. The pH of latex samples was 10.5. In certain of the samples, the pH of the latex was adjusted to 8.5 by bubbling carbon dioxide therethrough. Fifty gram samples were inoculated with 0.1 milliliter portions of a mixed culture of eight organisms consisting largely of Pseudomonas, Bacillus and Proteus species, previously isolated from spoiled samples of α-protein, latex and latex paint. The inoculated samples were maintained at about 25° C. At various intervals after inoculation, multiple streaks were made from these samples on poured nutrient agar plates and the streaked plates incubated at 30° C. for 48 hours. At the end of this period, the plates were examined for microbial growth. The results obtained from streaks made two weeks after inoculation are set forth in Table I. The results obtained with control samples containing no α-(α-nitrobenzyl)-2-pyridinemethanol are also set forth in Table I.

TABLE I

| Latex | Concentration in Percent by Weight | pH | Microbial Growth |
| --- | --- | --- | --- |
| Dow Latex 512-K [1] | 0.5 | 10.5 | None. |
| Do [1] | 0.1 | 10.5 | Do. |
| Do [1] | 0.01 | 10.5 | Do. |
| Control | None | 10.5 | Heavy. |
| Dow Latex 512-K | 0.5 | 8.5 | None. |
| Do | 0.1 | 8.5 | Do. |
| Do | 0.01 | 8.5 | Do. |
| Control | None | 8.5 | Heavy. |
| Dow Latex 762-W [2] | 0.5 | 10.5 | None. |
| Do [2] | 0.1 | 10.5 | Do. |
| Do [2] | 0.01 | 10.5 | Do. |
| Control | None | 10.5 | Heavy. |
| Dow Latex 762-W | 0.5 | 8.5 | None. |
| Do | 0.1 | 8.5 | Do. |
| Do | 0.01 | 8.5 | Do. |
| Control | None | 8.5 | Heavy. |

[1] 60 percent styrene-40 percent butadiene copolymer, 48 percent solids.
[2] 67 percent styrene-33 percent butadiene copolymer, 48 percent solids.

In another operation similar to that described above various commercial styrene-butadiene latexes were modified with other pyridinemethanol compounds. These latex samples had a pH of about 9.5. The samples were inoculated with a mixed culture of organisms as above described and maintained at about 25° C. for 7 days. Multiple streaks were made from the samples on nutrient agar plates, the plates incubated at 30° C. for 48 hours and thereafter examined for microbial growth. Control determinations were made with latex samples containing no pyridinemethanol compound. The results are set forth in Table II.

TABLE II

| Compound | Concentration in Percent by Weight | Latex | Microbial Growth |
|---|---|---|---|
| α,α'-Bis(α-nitrobenzyl)-2,6-pyridinemethanol. | 0.3 | Dow Latex 512-K | None. |
| 6-Methyl-α-(α-nitrobenzyl)-2-pyridinemethanol. | 0.3 | do | Do. |
| Do | 0.1 | do | Do. |
| Do | 0.3 | Dow Latex 512-R [1] | Do. |
| 4,6-Dimethyl-α-(α-nitrobenzyl)-2-pyridinemethanol. | 0.3 | Dow Latex 512-K | Do. |
| Do | 0.1 | do | Do. |
| Do | 0.3 | Dow Latex 512-R | Do. |
| Do | 0.3 | Dow Latex 762-W | Do. |
| Do | 0.1 | do | Do. |
| Control | 0.0 | Dow Latex 512-K | Very Heavy. |
| Do | 0.0 | Dow Latex 512-R | Do. |
| Do | 0.0 | Dow Latex 762-W | Do. |

[1] 60 percent styrene-40 percent butadiene copolymer, 48 percent solids.

In a similar operation with latex paint, paint samples were inoculated with a mixed culture of organisms as previously described and maintained at 25° C. for 24 hours. Multiple streaks were then made from the samples on nutrient agar plates and incubated at 30° C. for 48 hours and thereafter examined for microbial growth. Control determinations were made with latex paint samples containing no pyridinemethanol compounds. The results are set forth in Table III.

TABLE III

| Compound | Concentration in Percent by Weight | Microbial Growth 24 Hours |
|---|---|---|
| α,α'-Bis(α-nitrobenzyl)-2,6-pyridinemethanol. | 0.2 | None. |
| Do | 0.1 | Insignificant. |
| 6-Methyl-α-(α-nitrobenzyl)-2-pyridinemethanol. | 0.2 | None. |
| Do | 0.1 | Do. |
| 4,6-Dimethyl-α-(α-nitrobenzyl)-2-pyridinemethanol. | 0.2 | Do. |
| Do | 0.1 | Do. |
| α-(p-Fluoro-α-nitrobenzyl)-2-pyridinemethanol. | 0.2 | Do. |
| Do | 0.1 | Do. |
| Control | 0.0 | Very Heavy. |

The α-(α-nitrobenzyl)pyridinemethanols and α-(α-nitrobenzyl)quinolinemethanols of the present invention are also useful as toxicants in biocidal compositions for the control of insects, bacteria, fungi, nematodes and helminths. As insecticides they are useful for the control of such species as *Tetranychus bimaculatus* and *Periplaneta americana* and *Epilachna varivestis*. As microbicides they are useful for the control of microorganisms such as *Aerobacter aerogenes*, *Erwinia carotovora*, *Salmonella typhosa*, *Staphylococcus aureus*, *Aspergillus terreus*, *Penicillium digitatum*, *Rhizopus nigricans* and *Fusarium oxysporum lycopersici*. As anthelmintics, they are useful for the control of internal parasites such as *Nematospiroides dubius* and *Ascaris lumbricaides suum*. They may also be employed for the control of soil nematodes such as the *Meloidogyne* species and for plant pathogens such as *Colletotrichum lindemuthianum*.

In a representative operation of its use as a plant pathogen, substantially complete controls of bean anthracnose disease were obtained when cranberry bean plants susceptible to bean anthracnose disease caused by *Colletotrichum lindemuthianum* were sprayed with an aqueous dispersion containing 0.5 pound of an α-(α-nitrobenzyl)quinolinemethanol in 100 gallons of spray medium and thereafter inoculated with the disease organism.

The α-(halo-α-nitrobenzyl)pyridinemethanols and α-(halo-α-nitrobenzyl)quinolinemethanols are also useful as systemic insecticides for the control of flies infesting warm-blooded animals. In a representative operation for such use, complete kill of stable flies infesting mice were obtained when a 5 percent acetone solution of α-(p-fluoro-α-nitrobenzyl)-2-pyridinemethanol was administered orally to mice at a dosage of 200 milligrams per kilogram of body weight, and the mice thereafter exposed to the flies.

The unsubstituted α-(α-nitrobenzyl)pyridine- and α-(α-nitrobenzyl)quinolinemethanols are also useful as herbicides for the control of undesired vegetation such as cranberry bean plants (*Phaseolus vulgaris*, cranberry), corn (*Zea mays*) and wild oats (*Avena fatua*).

The phenylnitromethane and halophenylnitromethane starting materials to be employed in the preparation of the nitroalcohols may be prepared by the reaction of silver nitrite on benzyl or halobenzyl bromide or iodide in a non-reacting dispersion medium.

This application is a continuation-in-part of application Serial No. 687,855, filed October 3, 1957, now abandoned.

I claim:
1. A nitroalcohol selected from the group consisting of (a) an α-(α-nitrobenzyl)pyridinemethanol having the structure

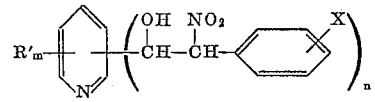

and (b) an α-(α-nitrobenzyl)quinolinemethanol having the structure

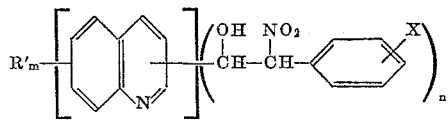

wherein R' is selected from the group consisting of methyl and ethyl, X is selected from the group consisting of hydrogen, fluorine, chlorine and bromine, m is a number from 0 to 2, inclusive, n is an integer of from 1 to 2, inclusive; and wherein in the bis(nitroalcohols), the nitroalcohol groups occupy non-vicinal positions.
2. α-(α-Nitrobenzyl)-2-pyridinemethanol.
3. α-(α-Nitrobenzyl)-3-pyridinemethanol.
4. α-(α-Nitrobenzyl)-4-pyridinemethanol.
5. α-(α-Nitrobenzyl)-2-quinolinemethanol.
6. α-(α-Nitrobenzyl)-4-quinolinemethanol.
7. 6-methyl-α-(α-nitrobenzyl)-2-pyridinemethanol.
8. 4,6-dimethyl-α-(α-nitrobenzyl)-2-pyridinemethanol.
9. α-(p-Fluoro-α-nitrobenzyl)-2-pyridinemethanol.
10. α,α'-Bis(α-nitrobenzyl)-2,6-pyridinemethanol.

References Cited in the file of this patent

Bergmann: The Chemistry of Acetylene and Related Compounds, page 80, Interscience Publishers Inc., New York (1948).

Phillips: J. Am. Chem. Soc., 70, pp. 452–4 (1948).

Sperber et al.: J. Am. Chem. Soc., vol. 71, pp. 887–90 (1949).

Burger et al.: J. Organic Chem., vol. 22, pp. 143–145 (1957).

UNITED STATES PATENT OFFICE
CERTIFICATION OF CORRECTION

Patent No. 3,005,825                                October 24, 1961

Dale N. Robertson

It is hereby certified that error appears in the above numbered patent requiring correction and that the said Letters Patent should read as corrected below.

Column 4, line 1, for "contained" read -- continued --; lines 30 to 35, the formula should appear as shown below instead of as in the patent:

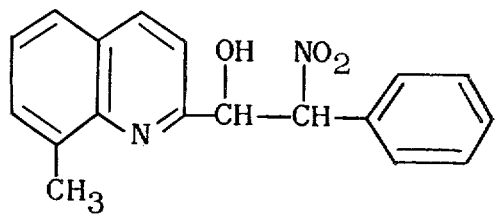

same column 4, line 50, for "3.8-dimethyl-" read -- 3,8-dimethyl- --.

Signed and sealed this 17th day of April 1962.

(SEAL)
Attest:

ESTON G. JOHNSON
Attesting Officer

DAVID L. LADD
Commissioner of Patents